March 27, 1962     G. W. PENNEY     3,026,964
INDUSTRIAL PRECIPITATOR WITH TEMPERATURE-CONTROLLED ELECTRODES
Filed May 6, 1959     2 Sheets-Sheet 1

INVENTOR.
GAYLORD W. PENNEY
BY
HIS ATTORNEYS

INVENTOR.
GAYLORD W. PENNEY

United States Patent Office 3,026,964
Patented Mar. 27, 1962

3,026,964
INDUSTRIAL PRECIPITATOR WITH TEMPERATURE-CONTROLLED ELECTRODES
Gaylord W. Penney, 216 Paris Road, Pittsburgh, Pa.
Filed May 6, 1959, Ser. No. 811,334
4 Claims. (Cl. 183—7)

In the operation of electrostatic precipitators certain difficulties are encountered when attempting to precipitate high-resistivity dust from industrial gases. The present invention provides apparatus for efficiently overcoming these difficulties.

It has previously been found that in attempting to precipitate a dust having high electrical resistivity, when a layer of the dust forms on a passive electrode, it acts as an insulator, causing an increase of the voltage drop through the layer of dust and a decrease of the ionizing current. Eventually (depending on the resistivity of the dust and other factors), the current punctures a hole through the dust layer. The localized current passing through the hole may cause either "back positive corona," which tends to remove from the dust particles the negative charge received in the ionizing section, or "spark-over," which discharges all electrodes connected to the electrode that has sparked, thus stopping ionization until the voltage builds back up again. It is therefore desirable to prevent this localized break-through of the current.

It has been proposed (see British Patent 643,363, published September 20, 1950) to overcome this breakthrough by cooling the passive electrode to reduce the electrical resistivity of the dust. Such cooling withdraws heat from the dust layer and causes moisture from the gas to be adsorbed on the deposited dust particles, thereby lowering their electrical resistivity. The British patent shows this idea as applied to an electronic precipitator of the air-conditioning type.

I have found that it is also possible to reduce the electrical resistivity of the dust by the application of heat to the dust layer. This is due to the fact that high-resistivity dust is usually composed largely of non-metallic particles. The electrical conductivity of most non-metallic materials is quite low at room temperature, but increases with a rise in temperature. In general it has been found that with such dust the resistivity starts to decrease after its temperature reaches 250° F. and reaches a degree of resistivity sufficiently low to facilitate precipitation when it reaches approximately the range 500° to 600° F., depending on the nature and composition of the dust.

In order to heat or cool the dust layer on the passive electrode it is advisable to make the electrode hollow, and pass a fluid at the desired temperature through the electrode, relying on heat conduction from the liquid, through the metal of the electrode, to the dust layer. Such an electrode can be called a "temperature-controlled electrode." The fluid may be either cooling water or hot industrial gases, or the like.

I have also found that the application of a temperature-controlled electrode to industrial precipitators introduces certain additional difficulties. The collecting section must be removed a sufficient distance from the ionizing electrode to prevent any substantial amount of ionizing current from reaching an uncooled grounded electrode and causing deleterious back-corona. But if the collecting section is moved far enough away from the ionizing electrode to eliminate back-corona, then positive corona induced by space-charge occurs, which also discharges the particles. These conditions are aggravated by the fact that to obtain maximum efficiency it is desirable to run the precipitator at the highest possible voltage, which is very close to the arcing potential, and the use of the temperature-controlled electrode makes it possible to run at higher voltages than would otherwise be possible.

The present invention provides apparatus which overcomes these difficulties and makes possible the practical application of the temperature-controlled electrode principle to industrial electronic precipitators.

Figure 1:
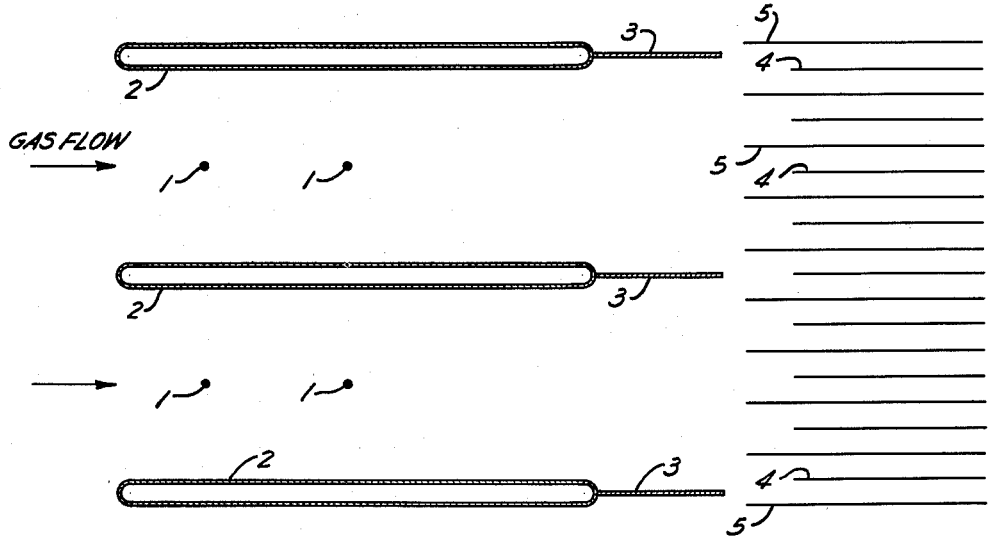
FIG. 1 is a diagrammatic cross-section illustrating one embodiment of the invention.

Referring to the drawings more particularly, FIG. 1 is a diagrammatic cross-section through a device designed as an electronic precipitator to handle industrial gases which contain dust of high electrical resistivity. The invention is illustrated as applied to a precipitator of the general type which has a series of adjacent precipitating cells each of which is relatively long and narrow, but of substantial height. In this type of precipitator the gas to be cleaned passes first through an ionizing section, where the dust particles receive an electrical charge, and then through a collecting section, where the charged particles are deposited on collecting plates.

In FIG. 1 the ionizing section is composed of wires 1 which extend vertically and constitute ionizing electrodes, and the flattened vertical tubes 2 which form the passive electrodes. The wires 1 are maintained at a high negative potential, and the passive electrodes 2 are maintained at a relatively low positive potential. The result of these potentials is a corona discharge from the wires, which is evidence that electrons (negative ions) are being driven across the space toward the passive electrodes. When gas carrying dust passes through this corona discharge the electrons tend to collect on the dust particles giving the particles a negative charge. When the gas passes through the collecting section the negatively-charged particles will drift toward the positively-charged collecting plates 4 under influence of the electrical field between plates 4 and 5.

The passive electrodes 2 are intended primarily to complete the electrical circuit which produces the corona discharge from the ionizing electrodes 1. However, some dust is incidentally deposited on the passive electrodes 2, and if the deposited dust includes dust of high electrical resistivity, there will result an excessive voltage gradient through the layer of collected dust. In conventional apparatus this would result in electrical breakdown of the dust layer at one or more points, and a localized "break-through" of the current at these points, to produce either "back corona," or "flashover." "Back corona" supplies positive ions which partially neutralize the negative charge the dust particles received in the ionizing corona. This so-called "back-ionization" reduces the efficiency of precipitation. When "flashover" occurs at relatively low voltages, the desired high potential on the ionizing electrodes cannot be maintained.

It has already been proposed in British Patent 643,363 to solve this problem by making the passive electrodes hollow and circulating a cooling liquid through them to thereby lower the resistivity of the deposited dust. The apparatus disclosed in the British patent is believed to be satisfactory for precipitating the low dust concentrations normally encountered in air-conditioning applications. However, it is not suitable for use in industrial installations for several reasons, which will become apparent as the description proceeds. The present invention provides a means of utilizing the temperature-controlled electrode principle in precipitators adapted for industrial installations.

It will be noted that in FIG. 1 the "temperature-controlled," or passive electrode 2 is in the form of a flattened tube of relatively great width relative to the space between its side walls. It will also be seen that there are two ionizing electrodes 1. The first of these electrodes is located a short distance inward from the gas entrance to the ionizing section, and the second one is located farther downstream.

It has been found that for industrial applications the ionizing wires should be approximately 4" from the passive electrodes. It has also been found that the optimum spacing between ionizing wires is approximately 6", and the spacing of the first ionizing wire is approximately 3" inward from the entrance end of the ionizer section.

Figure 2:
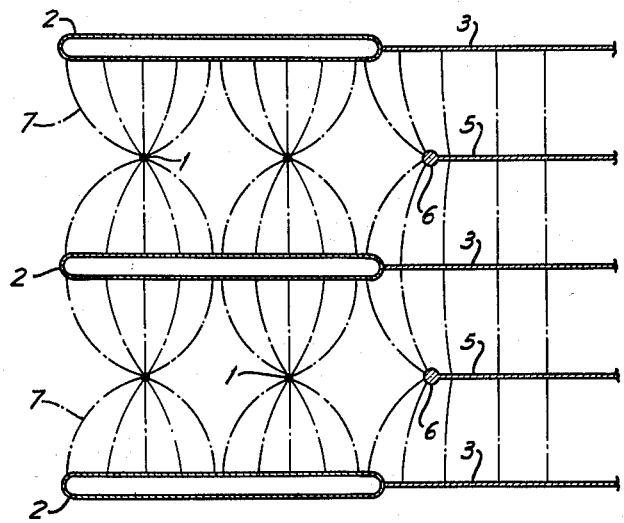
FIG. 2 is a view similar to FIG. 1 but showing a modification.
Figure 3:
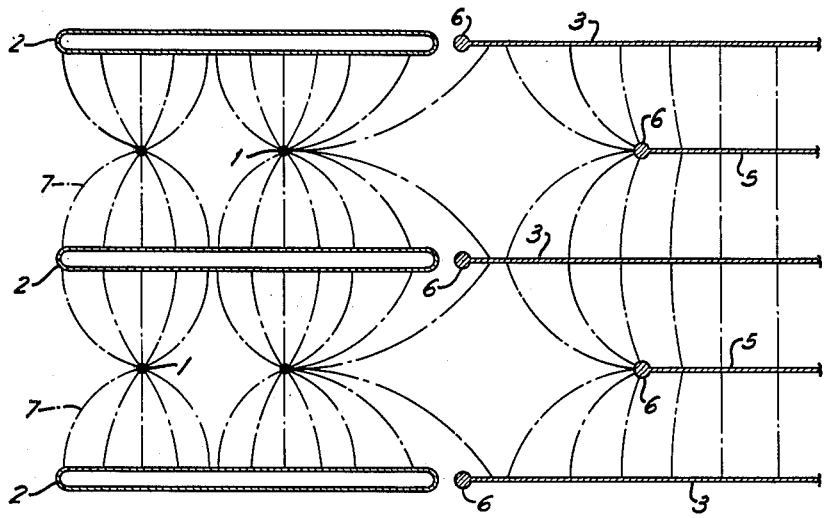
FIG. 3 is a view similar to FIG. 2 but showing another modification.

In view of the fact that the lines of force of the ionizing corona radiate fan-wise from the ionizing wire 1 to the passive electrode 2, this spacing of the ionizing wires makes efficient use of the major portion of the inner surface of the passive electrode 2 for the ionizing field, as indicated in FIGS. 2 and 3.

In industrial precipitators it is necessary to use ionizing wires of relatively large diameter. If dust deposit on the wire builds up to increase the effective diameter of the wire, it may lose its sharp "edge effect" so that corona no longer will be produced. Vibrators are employed to keep the wires clean, but they do not completely prevent the accumulation of dust on the wire. Accordingly it is preferable to have two wires arranged in tandem in the direction of air flow. With this tandem arrangement, should the first electrode become partially ineffective, the second one will provide the necessary ionization. More than two ionizing wires may be used, but in view of the increased efficiency provided by the controlled-temperature passive electrode, more than two wires will not normally be needed, and the use of additional wires would require extending the width of the cooled electrode farther in the direction of air flow, thus needlessly adding to the cost.

With very efficient wire vibrators it is possible to operate with only a single ionizing wire 1, so that it can be said that the invention contemplates the use of one or more ionizing wires 1.

*Prevention of Spot Break-Through*

As stated previously, the charged dust particles, after leaving the ionizing section, are deposited on the positively-charged plates of the collecting section. For purposes of economy, it is neither necessary nor practical to cool the positively-charged collecting plates. In British Patent 643,363, the uncooled collecting plates are located relatively close to the ionizing electrodes. I have found that if an appreciable amount of negative corona from the ionizing electrodes reaches to any part of an uncooled plate structure, positive "back-corona" will be produced, which tends to neutralize the negative charge on the dust particles, and thus to reduce materially the efficiency of dust collection. This would result from any attempt to use the structure of the British patent for precipitating industrial gases.

According to the present invention the collecting section is located far enough away from the last of the ionizing wires 1 to prevent development of any appreciable or deleterious amount of "back-corona."

Thus in FIG. 1 the collecting section is composed of alternate plates 4 and 5 spaced relatively closely to each other. Plates 4 are the dust collecting plates, and they should be at a grounded positive potential. Plates 5 should be at a negative potential high relative to ground, but low compared to the potential of the ionizing wires 1.

It has just been stated that for industrial precipitators the ionizing wires 1 should be spaced approximately 4" from the passive electrodes 2. I have found that with the construction illustrated in FIG. 1 the collecting section should be located so that no part of the collecting section which is in the plane passing through the ionizing wires is closer than approximately 14" to the last ionizing wire 1.

Grounded plates 3 extend downstream from the temperature-controlled electrodes 2. These plates serve somewhat as dust-collecting plates, but their primary purpose is to control space-charge, as will be subsequently explained.

To prevent any appreciable amount of negative corona created in the ionizing section from reaching the uncooled plates 3, the temperature-controlled electrode 2 should be extended downstream from the last ionizing wire an appreciable distance.

Figure 4:
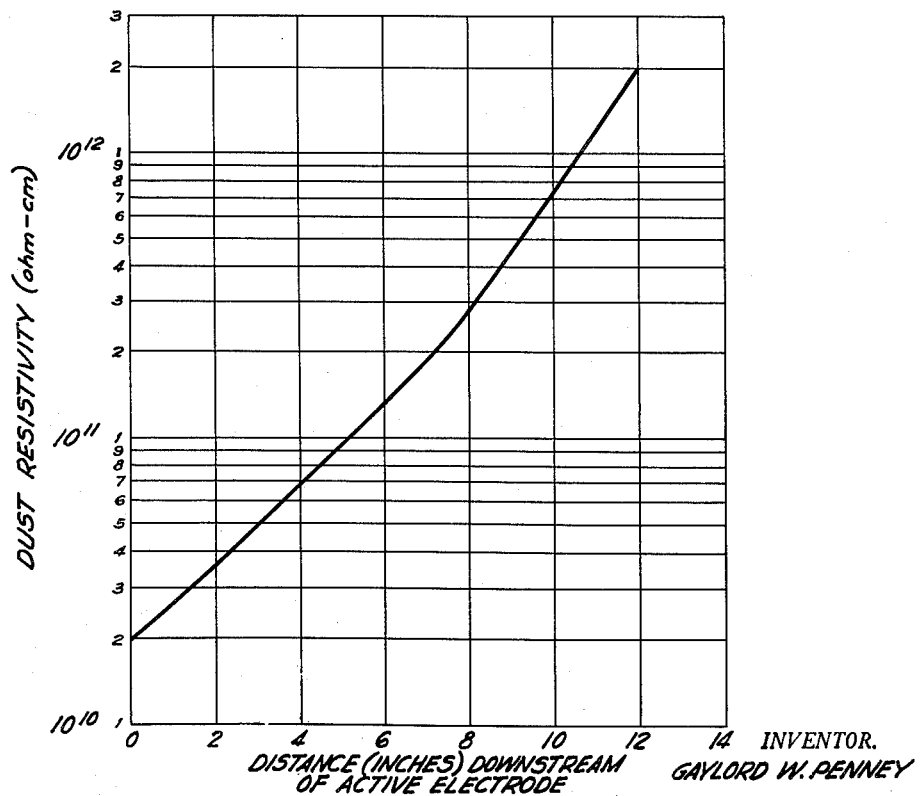
FIG. 4 is a diagram illustrating the relation of the extent of the temperature-controlled electrode to dust resistivity.

How far downstream the hollow electrode 2 should extend depends primarily on the resistivity of the dust, since this is the factor which is likely to cause spot breakthrough of the current. Experience has shown that the break-through phenomena are liable to occur with dust resistivities of $2 \times 10^{10}$ ohm cm. and above, at a current density through the layer of ½ microampere per sq. cm., if the passive electrode is not temperature-controlled. Based on this data, the diagram of FIG. 4 shows how far downstream from the last ionizing wire 1 the temperature-controlled electrode 2 must extend for a dust of a particular resistivity with this same current density. In this diagram the abscissa (distance from left to right) shows the distance in inches which the controlled-electrode 2 must extend downstream, while the ordinates (vertical distances) show the resistivity of the dust in ohm cm.

Thus the curve starts at the extreme left side of the diagram at a point directly opposite the ionizing wire 1 (point 0 on the horizontal scale) and a resistivity of $2 \times 10^{10}$ ohm cm. With this resistivity there will be only a slight tendency for breakthrough to occur even directly opposite the wire 1. Farther up on the curve we find that with a resistivity of $7 \times 10^{10}$ ohm cm. the electrode 2 should have its temperature controlled for 4 inches downstream from wire 1. With a resistivity of $2 \times 10^{12}$ the temperature-controlled electrode 2 should extend 12 inches downstream from the wire 1.

FIG. 4 merely shows the conditions at which back corona would tend to start. It does not predict any effects due to reduced voltage as the result of spark-over. Also, while back corona usually starts at $2 \times 10^{10}$ ohm cm. it is frequently possible to operate a precipitator handling dust with $2 \times 10^{11}$ with only slightly reduced efficiency, even without the temperature-controlled electrode.

*Prevention of Discharging the Charged Dust by Space-Induced Discharge*

As just explained, the uncooled, positively-charged collecting plate must be located a minimum distance away from the ionizing electrode. However, if there is any appreciable open space between the collecting plate 4 and the cooled electrode 2, then excessive "space charge" potentials will build up and will cause positive corona from any irregularities on the surface of the positively-charged collecting plate 4. This positive corona will tend to discharge the negative charge on the dust, and thus prevent the dust from precipitating.

It is well understood in the electrical art that, if a pointed electrode is near, or surrounded by, large surfaces with a sufficiently high potential difference so as to produce a critical gradient at the point, then a corona discharge is produced at the point. Ions of the same sign as the potential of the point will be repelled from the point and travel toward the large or passive electrode. It has not been generally recognized that a similar phenomenon can occur when a point or other projection of small radius of curvature is surrounded by surfaces at the same potential as the point but with a cloud of charged dust in the intervening space. In this case a "space-charge-induced" corona will occur if the net electric charge in the intervening space is sufficiently large to give the required critical gradient at the point.

Such a "space-charge-induced" positive corona may emanate from a point on a positively-charged collecting plate and serve as a source of ions of a sign opposite to that of the negative charge which the dust received in the ionizing section. These positive ions will rapidly neutralize the negative charge on the dust, and if a cloud of charged dust passes the point, the charge on the dust may be almost completely neutralized, thus seriously interfering with the precipitation of the dust.

The magnitude of these space-charge potentials, which can be calculated for any set of conditions, depends upon the spacing between the grounded walls which confine the gas carrying the charged dust.

If we assume a typical dust density of 3 grains per cubic foot of gas, and if we assume spherical particles 4 microns in diameter having a density of 3 grams per cubic centimeter, then there will be $.69 \times 10^5$ particles per cubic centimeter of gas. If these are charged in a field of 4500 volts per centimer there will be 3600 electronic charges per particle of $2.48 \times 10^8$ electronic charges per cm.$^3$. If this suspension of charged dust is confined between plane parallel grounded metal plates, with a spacing between plates of 20 cm. (approx. 8 inches) the resulting potential midway between plates can be demonstrated by Poisson's equation to be 22,500 volts at the middle of the space. This potential corresponds to a voltage gradient at the grounded surface of 4500 volts per cm. This is usually permissible. However, if this spacing between the parallel plates is 16" instead of 8", then the resulting potential midway between plates would be 90,000 volts and this would almost certainly cause a space-charge-induced positive corona which would discharge the negative charge on the dust.

Dust densities may easily exceed the 3 grains per cubic ft. assumed. In this case the number of particles per cm.$^3$ will be correspondingly increased. In the above calculations the 3600 electronic charges per particle was the equilibrium charge in a field of 4500 volts per cm. However, if the dust density were doubled, the same charge per particle would not be obtained due to the self-limiting nature of the corona charging process. The upper limit of charge obtainable is that at which the potential of the high voltage wire is just sufficiently above the potential of the space to give a vanishingly small corona at the wire surface. For typical dimensions this requires that the wire must be approximately 25,000 volts above the potential of the space, and the wire cannot be above the sparkover potential. This serves to limit the charge on dust to a value which will not result in corona from the grounded surfaces, provided that these grounded surfaces are relatively smooth and continuous, and provided that the spacing between the grounded plates is not materially greater than the spacing between passive electrodes in the charging section.

In the apparatus illustrated in FIG. 1 these conditions have been met by confining the charged dust between grounded plates 3 that are spaced apart at approximately the same distance as are the passive electrodes 2. The plates 3 have their upstream ends attached directly to the cooled positive electrodes 2. This spacing of the grounded plates 3 will prevent the development of any appreciable corona due to space-charge.

If the plates 3 are not provided, but an open gap is left between the ionizing section and the collecting section, then a space-charge potential builds up much greater than that mentioned above in connection with plates spaced 8" apart, and this space-charge potential would induce positive corona and remove the negative charge from the dust, as just explained.

It will be noted that in FIG. 1 there is a small gap between the downstream end of the grounded plate 3 and the dust-collecting plate 4. This gap is necessary because plates 3 and 4 are at different potentials, but it should be smaller than the spacing of the ionizing wire 1 from the passive electrode 2. A small gap of this size will not result in the build-up of enough space-charge voltage to cause appreciable corona.

Reduction of Sparkover

Another important feature resides in the special shape of the flattened tubes used for the passive electrodes 2. This shape gives a more uniform field across the space from the wire 1 to the passive electrode 2 than is possible with the cylindrical electrode shown in British Patent 643,363. With the cylindrical electrode the field is highly concentrated at the line where the wall of the cylinder is closest to the wire. Hence if high voltages are used, there results a spark-over along this line. The more uniform distribution of the corona field over the wall of the flattened tubular electrode is illustrated diagrammatically in FIGS. 2 and 3.

The more uniform field produced with the flat-walled electrode 2 reduces the tendency for sparkover to occur, and thus permits higher operating voltages with increased efficiency. It can be demonstrated by mathematical calculations that with the structure disclosed in the British patent operating voltages would have to be so much lower than those usable with the flattened tube electrode of the present invention, that the resulting charge per dust particle would be only about ⅓ of that obtainable with the flat passive electrodes of the present invention.

In the above description, for purpose of clarity, mention has been made of only the parts defining a single gas passage through the precipitator. It will be clear from FIG. 1 that two or more parallel gas passages should be provided in order to utilize both sides of the interior electrode members.

Embodiment of FIG. 2

FIG. 2 illustrates the application of the principles of the invention to an industrial precipitator of a somewhat different type.

In this form the spacing of the ionizing wires 1 relative to the temperature-controlled electrodes 2 is the same as previously explained. But in this case the collecting section is formed by a pair of grounded electrodes 3, each of which is in the plane of an electrode 2, together with a single high-voltage non-discharging electrode 5, which corresponds in function with a plate 5 of FIG. 1, that is, to create a field between electrodes 3 and 5, which field causes the charged dust particles to drift toward the collecting plates 5.

In this case the grounded electrodes 3 serve both as the dust collecting plates and as the grounded plates which control space discharge. The up-stream ends of the grounded plates 3 should closely approach the temperature-controlled electrodes 2, and may be attached to these electrodes as illustrated in FIG. 2.

If the plates 3 are to be at a different potential from the electrodes 2, then they may be called collecting plates, and should be spaced a short distance away from electrodes 2, as shown in FIG. 3.

As shown, the upstream end of the non-discharging high voltage electrode 5 may be much closer to the ionizing wire 1 than may an uncooled grounded part. This is due to the fact that since electrode 5 is usually at the same potential as the ionizing wire, the negative corona ions from wire 1 will not be attracted to electrode 5, and hence no "back-corona" will be produced at the upstream end of electrode 5.

The electrode 5 may therefore be located in the same plane as the ionizing wire 1 and with its upstream end spaced from the last of the ionizing wires at approximately the same distance as that between the two ionizing wires, namely 6", as shown in FIG. 2. Such an arrangement permits shortening the over-all length of the precipitator, which is an important consideration for certain installations, since it takes up less room in the building.

In the arrangement of FIG. 2 the temperature-controlled electrode 2 need extend downstream only to a point slightly beyond the midway point between the last ionizing wire 1 and the upper end of the electrode 5. It is desirable to keep these electrodes 2 as short as possible in order to reduce their cost and also reduce the amount of fluid which must be circulated through them.

The reason it is possible to use a short cooled electrode 2 in the arrangement of FIG. 2 is that the electric field from the electrode 5 tends to restrict passage of ionizing current downstream to the uncooled electrode 3. The disposition of the electric fields is illustrated in diagrammatic form in FIG. 2, where the dot-dash lines 7 indicate the lines of electric force.

Ions in air tend to be carried with the air in a random or Brownian molecular motion. In an electric field ions experience a force in the direction of the electric field and so are driven relative to the air in the direction of the electric field. For electrons or molecular ions in usual corona fields, the velocity due to the electric field is usually large compared to the air velocity so that for most purposes we can say that electrons or molecular ions move in general along the lines of electric force. In the arrangement shown in FIG. 2, the lines of electric force originating at electrode 5 will meet those from wire 1 at a point on the passive electrode approximately midway between electrodes 1 and 5. The exact point will depend on the relative sizes of electrodes. The air velocity will tend to carry ions slightly downstream, but the midpoint is a close approximation for typical conditions. So the cooled portion of the passive electrode 2 needs to extend only slightly beyond this midpoint. This applies to the case where the electrode 5 is spaced the usual 6″ from the wire.

If the electrode 5 is located farther downstream (as for example in applying the invention to an existing precipitator), then the temperature-controlled electrode should extend farther downstream, as shown in FIG. 3. However, the temperature-controlled electrode need not extend to the midway point between the ionizing wire 1 and the end of electrode 5. In this case the lines of force which extend far enough downstream to reach the non-cooled electrode 3 are so weak as not to cause trouble.

It was explained above in connection with FIG. 1 that the downstream extent of the temperature-controlled electrode is dependent on the resistivity of the dust. In the type shown in FIGS. 2 and 3 the extent of electrode 2 is influenced by both the resistivity of the dust and the location of electrode 5. For this type the general rule may be stated that with a dust of medium resistivity (i.e., in the lower range where resistivity is enough of a problem to require the use of a temperature-controlled electrode) the electrode 2 should extend either (a) to a point approximately midway the last ionizing wire and a following non-discharging electrode, or (b) to a point 6″ from the ionizing wire (i.e., 1½ times the wire-to-passive-electrode spacing), whichever is smaller.

This rule expresses the minimum extent. With dusts of higher resistivity, the electrode 2 should extend still farther downstream, in proportion as indicated by the curve of FIG. 4.

The upstream ends of non-discharging electrodes may be formed with cylindrical enlargements 6 to provide a larger radius and thus further avoid corona, which results from the "edge effect."

Conclusion

It will be understood from the above description that this invention permits using the temperature-controlled electrode principle in an industrial precipitator while operating at high voltage and efficiency. The invention solves what would appear to be the mutually exclusive problems caused by back-corona and space charge potentials.

In the description the spacing of certain parts was stated in approximate dimensions. These dimensions give the optimum results with average high-resistivity dusts. However, with some small variation from these dimensions, there may result some slight "back-corona," but not enough to interfere seriously with commercial operation, while still obtaining a major benefit of the present invention. The purpose of the invention is to prevent any deleterious break-through or back ionization, that is, such as would appreciably affect the efficiency of precipitation.

The exact value of permissible current density that may exist without producing back-corona will vary with the type and resistivity of dust. Probably the best test to determine whether any back-corona is being produced under any set of conditions is to take a time photograph in a darkened room at a long exposure. In such a photograph only light emitted by electrical discharges will show in the picture. If the precipitator is operating properly and there is no back-corona, only a uniform glow along the wires will show in the photograph. Any back-corona will show up as glowing localized spots on areas of the passive electrodes.

If a photograph taken in a darkened room shows no glowing spots except along the corona-producing wire then there is no reverse corona. This is the desirable condition. Any reverse corona at passive electrodes tends to neutralize the charge on some dust and also tends to cause sparkover and thus reduce the permissible operating voltage. However, both effects are gradual so that a slight reverse corona only causes a slight loss in efficiency. So while it is desirable to eliminate all back-corona the difficulties are a matter of degree.

The loss of charge due to corona induced by space-charge potentials may be rather abrupt so that, once it starts, the loss of charge and therefore, loss of dust-removing efficiency is quite abrupt. For example, if in FIG. 1, the electrodes 3 were omitted, and if the distance from passive electrodes 2 to collecting plates 4 and 5 were 20″ for the usual 4″ wire to passive electrode spacing, then space charge induced corona would usually start from the edges of plates 4 and 5. Such a positive corona could discharge substantially all of the dust near the plates, while the corona is maintained by the space charge due to dust leaving the ionizer. Thus as the dust moves toward the collector it may be almost completely discharged. The use of the confining electrodes 3 avoids this loss of dust charge resulting from space charge potentials.

The invention therefore provides simple and efficient means for applying the temperature-controlled electrode principle to industrial precipitators. It not only avoids the difficulties of current "break-through," such as "back-corona" and "flashover," but also controls the loss of efficiency that can result from "space charge" potentials.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. An electrical precipitator comprising:
   an ionizing section having at least one pair of related passive electrodes which are hollow and adapted to be temperature-controlled by fluid flowing therein and which are of greater extent in the direction of gas flow than in the direction at right angles to the gas flow;
   the related hollow passive electrodes being spaced apart and facing each other with at least one ionizing electrode located equidistant between the hollow passive electrodes;
   each passive electrode having a flat wall confronting the ionizing electrode;
   a collecting section having non-temperature-controlled collecting plates and high-voltage electrodes;

the parts being so dimensioned and located that the non-temperature-controlled collecting plates are spaced downstream from the ionizing electrodes a distance which is greater than the distance from an ionizing electrode to a related hollow passive electrode;

and non-temperature-controlled electrodes extending substantially the entire distance between the hollow passive electrodes and the collecting section to enclose the space between the temperature-controlled electrodes and the collecting section to prevent any appreciable amount of corona due to space-charge.

2. An electrical precipitator comprising:

an ionizing section having at least one pair of related relatively flat hollow passive electrodes adapted to be temperature-controlled by fluid flowing therein;

the related hollow passive electrodes being spaced apart and facing each other with at least one ionizing electrode located equidistant between the hollow passive electrodes;

a collecting section having non-temperature-controlled collecting plates and high-voltage electrodes;

the parts being so dimensioned and located that the temperature-controlled electrodes extend downstream past the last ionizing electrode a distance which is at least approximately equal to the distance between an ionizing electrode and a temperature-controlled electrode, and the non-temperature-controlled collecting plates are spaced downstream from the ionizing electrodes a distance which is greater than the distance from an ionizing electrode to a related hollow passive electrode;

and non-temperature-controlled electrodes extending substantially the entire distance between the hollow passive electrodes and the collecting section;

said non-temperature-controlled electrodes being at a potential which is low relative to the potential of the ionizing electrode;

said non-temperature-controlled electrodes being spaced apart approximately the same distance as the spacing between the related hollow passive electrodes.

3. An electrical precipitator comprising:

an ionizing section having at least one pair of flattened tubular passive electrodes adapted to be temperature-controlled by fluid flowing therein, and spaced apart to form a gas passage therebetween;

at least one ionizing electrode spaced midway between the temperature-controlled electrodes;

a collecting section having grounded collecting plates and high voltage electrodes;

and grounded plate portions extending substantially the entire distance between the tubular passive electrodes and the collecting section, said grounded plate portions being spaced apart approximately the spacing between the temperature-controlled electrodes.

4. An electrical precipitator comprising:

an ionizing section having at least one pair of flattened tubular passive electrodes adapted to be temperature-controlled by fluid flowing therein, and spaced apart to form a gas passage therebetween;

a pair of ionizing electrodes arranged in tandem and spaced approximately 4" from the temperature-controlled electrodes;

the second ionizing electrode being spaced downstream from the first ionizing electrode a distance equal to 1½ times the distance from an ionizing electrode to a temperature-controlled electrode;

a collecting section comprising a plurality of alternate high potential and grounded plate electrodes spaced closely together;

no part of the collecting section being closer to the second ionizing electrode than approximately 1½ times the distance from an ionizing electrode to a temperature-controlled electrode;

and grounded plates extending substantially the entire distance between the hollow passive electrodes and the collecting section, said grounded plates being spaced apart approximately the same distance as the spacing between the temperature-controlled electrodes.

References Cited in the file of this patent

UNITED STATES PATENTS

| | | |
|---|---|---|
| 1,343,285 | Schmidt | June 15, 1920 |

FOREIGN PATENTS

| | | |
|---|---|---|
| 855,099 | Germany | July 8, 1949 |
| 643,363 | Great Britain | Sept. 20, 1950 |

UNITED STATES PATENT OFFICE
CERTIFICATE OF CORRECTION

Patent No. 3,026,964                          March 27, 1962

Gaylord W. Penney

It is hereby certified that error appears in the above numbered patent requiring correction and that the said Letters Patent should read as corrected below.

Column 4, line 26, for "shows" read -- show --; column 5, line 19, for "centimer" read -- centimeter --; line 20, for "of" read -- or --.

Signed and sealed this 10th day of July 1962.

(SEAL)
Attest:

ERNEST W. SWIDER
Attesting Officer

DAVID L. LADD
Commissioner of Patents